United States Patent [19]

Tanis

[11] Patent Number: 4,776,529
[45] Date of Patent: Oct. 11, 1988

[54] HELICOPTER PREHEAT ASSEMBLY

[76] Inventor: Peter G. Tanis, R.R. 1, Glenwood, Minn. 56334

[21] Appl. No.: 893,668

[22] Filed: Aug. 6, 1986

[51] Int. Cl.⁴ .............................................. B64D 47/00
[52] U.S. Cl. .................................... 244/1 R; 219/202; 184/104.1
[58] Field of Search ............... 244/1 R; 219/202, 205, 219/526; 184/104.1, 104.2; 123/142.5 R, 142.5 E

[56] References Cited

U.S. PATENT DOCUMENTS

| | | | |
|---|---|---|---|
| 1,806,442 | 5/1931 | Bell et al. | 184/104.2 |
| 2,698,374 | 12/1954 | Carpenter | 184/104.2 |
| 3,213,263 | 10/1965 | Strenbergen | 184/104.2 |
| 3,416,633 | 12/1968 | Swearingen | 184/104.1 |
| 3,953,707 | 4/1976 | Tanis | 184/104.2 |

OTHER PUBLICATIONS

Aviation Safety, Oct. 1, 1984, vol. IV, No. 19, Reprint.

*Primary Examiner*—Galen Barefoot
*Assistant Examiner*—L. M. Fiorito
*Attorney, Agent, or Firm*—Burd, Bartz & Gutenkauf

[57] ABSTRACT

A preheat apparatus for a helicopter wherein certain critical helicopter components are preheated preparatory to takeoff of the aircraft. The critical components include the main rotor gear case, the intermediate gear case, the tail rotor gear case, the oil tank and cooling assembly and the engine gear cases. In certain aircraft, these also include the fuel control unit and the drive reduction gear case. Heat pads are installed with respect to the critical components in strategic locations and are sized and shaped to fit the component. The heat pads are connected by wiring harness that is connected to an external source of electrical power.

18 Claims, 4 Drawing Sheets

HELICOPTER PREHEAT ASSEMBLY

BACKGROUND OF THE INVENTION

In cold weather, certain helicopters start and operate poorly, particularly certain critical components or systems. These systems include the engine gear boxes, the main rotor gear case or gearbox, the intermediate gear case, the tail rotor, the oil tank and the oil cooler assembly, and on certain engines, the fuel control unit and drive reduction gear case. The gear cases have a poor fit about the gears due to the differential rates of expansion of the various metals of which they are made.

For example, gearboxes are constructed of aluminum while the gears are steel, which has half the coefficient of thermal expansion. The unit is assembled at room temperature and designed to withstand high temperatures. At low temperature, the aluminum contracts at twice the rate of steel, resulting in a tight gear fit. Magnesium gear cases have an even higher coefficient of thermal expansion. For proper fit, they must be brought up to a warmer temperature. A turboshaft engine will usually start in cold weather. However, due to poor component fits at low temperature, the engine may be slow to accelerate. The slow acceleration will cause higher temperatures in the burner cans and turbine section of the engine. This is called a "hot start". This will at best shorten the engine life and, at worst, destroy the hot section of the engine. Another problem exists in the reduction gearing to the power shaft of the engine. This area of the engine is subject to abnormal wear and sometimes failure due to the differential rates of expansion of the components. The fit of bearings and oil transfer sleeves is sometimes incorrect at low temperatures.

The batteries on board the helicopter have less energy available for starting the engines when cold. At low temperatures, the cold turboshaft engine may require more power to start than the cold batteries can deliver. For this reason, it is desirable to warm the turboshaft engines of the helicopter. The oil tank and oil cooler can be preheated so the oil will maintain uniform heat transfer throughout the various components of the helicopter. The oil also provides lubrication. Turbine oil used in the engine flows well at low temperatures, but the heavier gear lubricating oils used in transmissions need warming to lubricate properly.

One method of bringing the helicopter systems up to temperature is to run the engine for 15 to 20 minutes in moderately cold weather. Often helicopters are used for medical rescue or other applications in which quick response is needed. These aircraft are often based at locations where conventional preheat systems cannot be used.

Some conventional systems include gas-fired, hot air blowing preheaters. These require partial dismantling of the aircraft and preheat only one piece of equipment at the time. In certain locations, they are not legal for use.

Electric automotive-type preheaters with resistant elements and blower fans have been used. These require partial disassembly of the aircraft for use. The units have been known to present a fire danger.

SUMMARY OF THE INVENTION

The invention pertains to a preheat apparatus for a helicopter in order to bring critical components up to operational temperature preparatory to taking off of the aircraft. The preheat assembly includes a plurality of heat pads which are interconnected by a wiring harness which is attached to conventional ground power source, such as 110 AC or 220 AC outlet. The heat pads are relatively thin elements and are placed at strategic locations throughout the helicopter so as to be most effective. The heating pads are sized and shaped according to the strategic location selected and the space available. The size and heat output of each heat pad is determined by the placement location. The heat pads act in combination to ready the aircraft for takeoff on very short notice in low-temperature environs.

IN THE DRAWINGS

DESCRIPTION OF A PREFERRED EMBODIMENT

Figure 1:
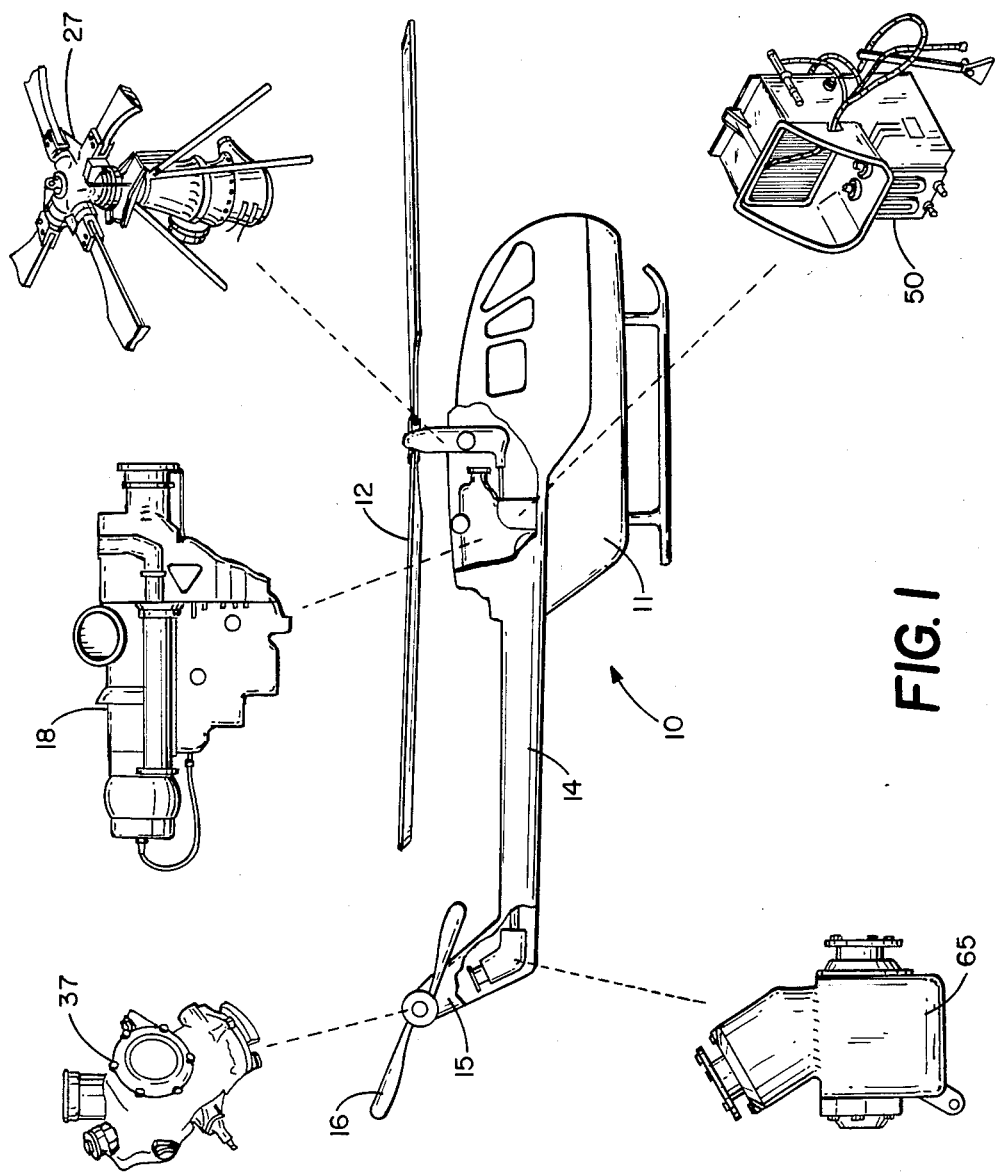
FIG. 1 is a side schematic elevational view of a helicopter equipped with a preheat apparatus according to the invention with certain helicopter components emphasized in exploded view.

Referring to the drawings, there is shown in FIG. 1 a helicopter 10 equipped with a preheater apparatus according to the present invention. The helicopter 10 is conventional having a main fuselage and cabin 11, a main rotor 12 for lift and forward thrust, and a horizontal tail boom 14. An inclined tail boom or vertical fin 15 extends from the rear of the horizontal tail boom 14 and carries a rear rotor 16 to offset the torque produced by the main rotor 12. Helicopter 10 is equipped with a preheat apparatus according to the invention whereby it is quickly prepared for takeoff in cold weather without apprehension of damage or engine failure. The preheat system of the invention consists of a plurality of electric heat pads strategically fixed to critical components of the helicopter, which act together to alleviate the usual nuisances associated with cold-weather starting and permit swift operation of helicopter 10, as in emergency circumstances. The heat pads are physically sized and shaped to fit upon the externally exposed surfaces of the components which they are meant to heat. The heat pads are powered by external power source, such as household current.

Figure 2:
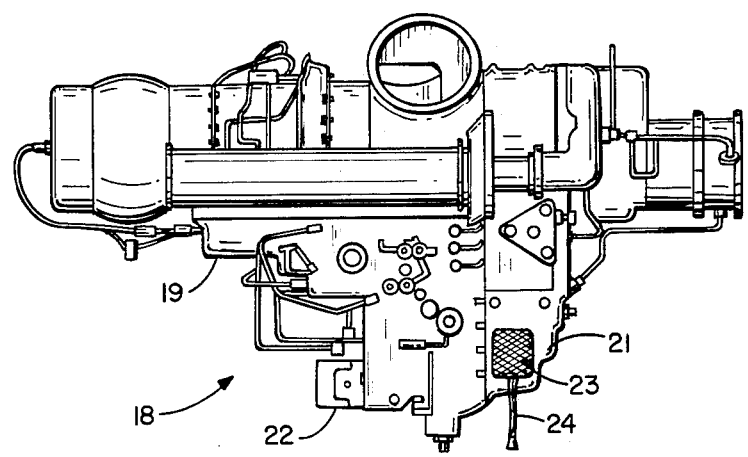
FIG. 2 is a side schematic view of the engine assembly of the helicopter of FIG. 1 having a heat pad installed thereon.

Helicopter 10 has an engine assembly installed in fuselage 11 in the upper portion thereof indicated generally at 18 in FIG. 1 and shown in enlarged view in FIG. 2. Engine assembly 18 can comprise one or two engines that will usually be turboshaft variety, although in older or smaller aircraft the engine might be a piston variety. The particular engine depicted is an Allison 250, a turboshaft engine. A second such engine is symmetrically positioned in helicopter 10. At low temperature, the engines start but accelerate slowly due to poor component fits. This can cause higher temperatures in the burner cans in turbine section of the engine. The resultant "hot start" will shorten the engine life and sometimes destroy the hot section of the engine.

Engine assembly 18 has engines 19 fixed to an accessory drive gear case 21. The accessory drive gear case 21 carries many accessories driven by the engine. Examples are the starter-generator, which may be combined or separate units; the fuel control unit; the fuel pump; the tachometer generator; the vacuum pump and the hydraulic pumps. An accessory grouping indicated at 22 in FIG. 2 is fixed to the accessory gear case 21. A first electrical heat pad 23 is bonded to the accessory gear case 21 at a lower portion thereof on a flat surface below the data plate with silicone rubber RTV adhesive. A first power lead 24 extends downwardly from the first heat pad 23. First heat pad 23 is positioned on the accessory gear case 21 since this area produces the most drag upon turning over the engines due to the numerous accessories carried by it. There is also some lubricant located in this area of the gear case which is heated by the pad and tends to conduct the heat to other components. When this area of the engine assembly is heated, the gears contained therein turn over under the influence of the starter motor to the point where fuel and then ignition are added after which the engines accelerate quickly. Another first heat pad is similarly situated with respect to the other engine (not shown).

Figure 3:
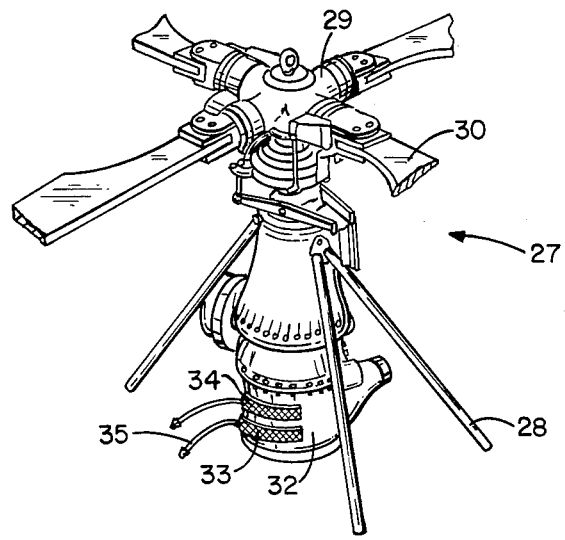
FIG. 3 is a perspective view of a portion of the main rotor transmission of the helicopter of FIG. 1 having heat pads installed thereon.

The main rotor transmission is secured on top of fuselage 11 above the engine assembly 19, indicated generally at 27 in FIG. 1 and shown in enlarged view in FIG. 3. A plurality of support struts 28 support the transmission assembly 27 above the fuselage 11. A hub 29 is connected by shaft means (not shown) to the transmission and carries the rotor blades 30. The main transmission gear case 32 carries not only transmission gears but a clutching mechanism for autorotation. When the engines lag on power output, the clutch disengages the rotor from the engine resulting in autorotation of the rotor to provide some lift and control for the aircraft during descent. At low temperature, a poor fit for the gearing and clutches inhibits proper autorotation. A pair of second electric heat pads 33 are bonded to the front side of the main transmission gear case at a lower portion below the lubricant level. Second heat pad power leads 35 extend to the right-hand side of the aircraft to a wiring harness for electrical power. Second heat pads 33 provide preheat to the main transmission area to heat the gears and clutches therein and provide for their proper functioning.

Figure 4:
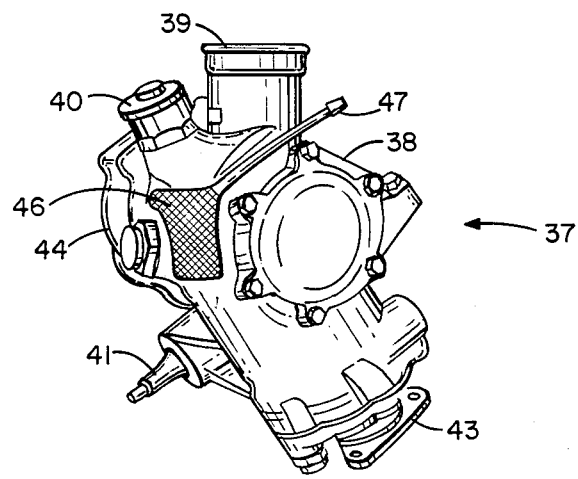
FIG. 4 is a side elevational view of the tail rotor transmission of the helicopter of FIG. 1 having a heat pad installed thereon.

The tail rotor transmission is located at the upper tip of the inclined vertical fin 15 indicated generally at 37 in FIG. 1 and in enlarged view in FIG. 4. The rear tail rotor transmission includes a casing 38, a lubricant fill 39, a sight opening 40 and a chip light 41. One end of casing 38 provides for power input indicated at 43, with power output to the rear rotor 16 at 44. The gears and casing 38 were assembled at normal room temperature and, due to differential rates of expansion of the metals, do not fit as well at cold temperature as at warmer temperatures. A third electric heat pad 46 is installed or bonded on the casing 38 and has a third power lead 47.

Heat pad 46 provides preheat to the casing 38, which is distributed throughout by the lubricant located therein. This raises the temperature of the gears and casing to insure proper fit.

Figure 5:
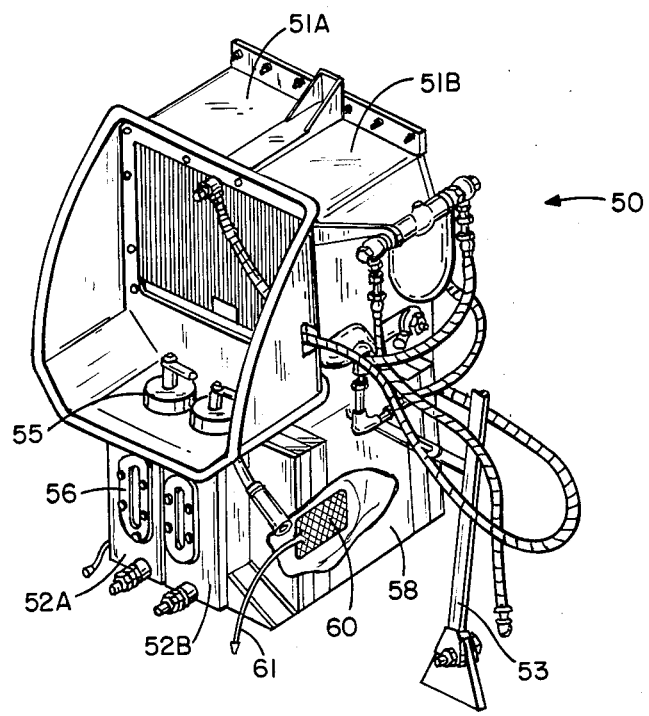
FIG. 5 is a view in perspective of the oil cooler/oil tank assembly of the helicopter of FIG. 1 having a heat pad installed thereon.

The oil cooler and tank assembly is located adjacent the engine assembly in fuselage 11 and indicated generally at 50 in FIG. 1 and in enlarged view in FIG. 5. Oil cooler and tank assembly 50 includes oil coolers 51A, 51B for right and left engines respectively, and oil tanks 52A, 52B for the same. Support struts 53 support the assembly with respect to fuselage 11. Oil fill caps 55 are provided for filling the tanks 52, which are gauged by sight openings 56. Engines 19 are dry sump engines. Oil remains in the tank when the engines are inoperative. A housing wall 58 surrounds the sides of the oil tank 52B. A fourth heat pad 60 is secured to one side of the oil tank, as by suitable bonding or the like and has a fourth heat pad power supply lead 61. The heat pad 60 is located inside of the housing wall 58. A similar fourth heat pad is attached to the side wall of the other oil tank 52A (not shown). Together heat pads 60 supply preheat to the oil located in the tanks. Upon operation of the engines, oil circulates heat throughout the engine. Heat is quickly dissipated to the engine parts, which are better able to function upon initial operation of the engines.

Figure 6:
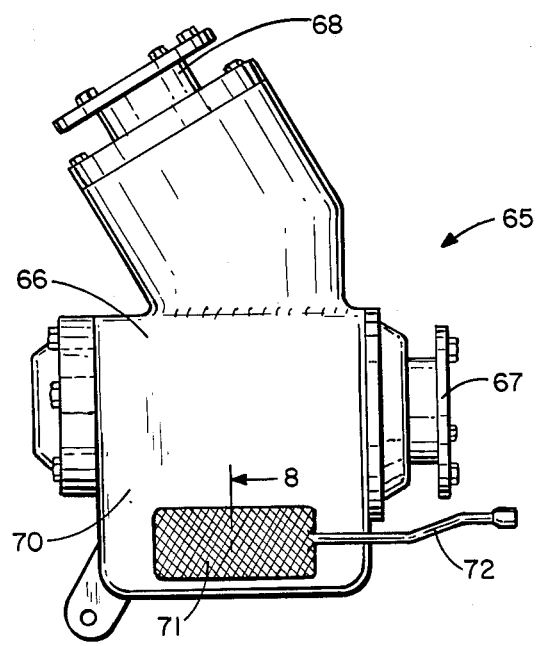
FIG. 6 is a side view in schematic of the intermediate transmission of the helicopter of FIG. 1 having a heat pad installed thereon.

The helicopter intermediate transmission is located at the intersection of the horizontal tail boom 14 and the inclined vertical fin 15. It serves to redirect the power from the output shaft of the engines 19 to the rear rotor 16. The intermediate transmission is indicated at 65 in FIG. 1 and in enlarged view in FIG. 6. A transmission casing 66 has an input section 67, an output section 68 and a main gear housing 70. Heat to the gear casing and lubricant is desirable to keep the gears in the casing 66 at or above the relatively warm temperature at which they are assembled. The differential rate of expansion and contraction of the metals of the parts causes a poor fit at low temperature. A fifth heat pad 71 is fixed to the intermediate transmission housing 70 at a location below the usual lubricant level in the housing. A power lead 72 leads from the heat pad 71. Heat pad 71 heats the gear case and the lubricant in the main housing 70. This acts to quickly disperse heat to the gears and bearings therein. When so preheated, the intermediate transmission 65 is ready for service on short notice.

Figure 7:
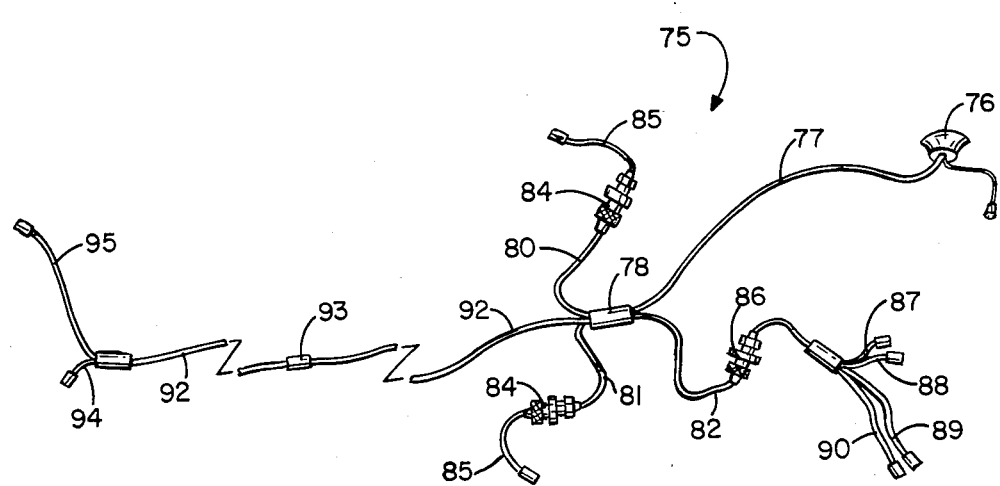
FIG. 7 is a schematic view of the wiring harness of the helicopter preheater of the invention for interconnecting the various heating elements to a ground power source.

FIG. 7 illustrates a wiring harness 75 for interconnection of the first through fifth heat pads to a source of electric current. A flush mounting power plug 76 is adapted to be mounted in the left-hand side of the nose of the helicopter. A power lead segment 77 leaves the power plug 76 and is adapted to be routed with wire bundles under the cabin floor of the helicopter to the floor of the engine compartment. The power lead segment 77 joins a circuit board indicated at 78 in FIG. 7 where leads going to each of the heat pads join the power lead segment 77. The engine leads 80, 81 and the oil tank leads 82 leave the junction at the circuit board for penetration through the engine compartment floor. These leads are adapted to pass through fire seals installed in the compartment floor. Cannon plug-type electrical connectors 84 can be used by each engine heat pad so that the engine can be removed if necessary. Power lead connectors 85 extend from the electrical plugs 84 for extension to the power leads 24 of the engine heat pads 23. An electrical connector 86 is connected to the oil tank leads segment 82 on one side and to segments 87 through 90 for connection to the power leads 35 and 61 connected to heat pads 33, 60 located on the main transmission gear case and the oil tank assemblies. A tail boom lead 92 leads from the circuit board 78 to the tail boom. It can be routed aft to the tail boom attachment area following existing wire bundles. An electrical connector 93 is placed in the tail boom lead 92 to be located where it enters the tail boom so that the tail boom can be removed for servicing. A lead segment 94 extends from the tail boom lead 92 to the intermediate transmission heat pad power lead 72. A tail rotor lead segment 95 leads to the power lead 47 of the tail rotor heat pad 46.

Figure 8:
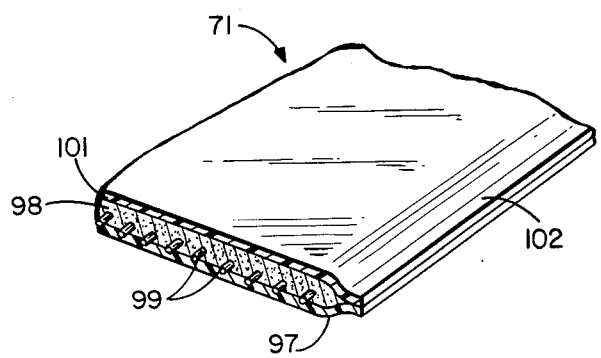
FIG. 8 is a cross-sectional view of one of the heat pads of the preheat assembly taken along the line 8—8 of FIG. 6.

Suitable heat pad structure is shown in FIG. 8, for example, referring to the first heat pad 71 located on the intermediate gear case. A portion of the heat pad 71 is shown partially in section in FIG. 8. Heat pad 71 includes a first or proximal layer 97 of suitable insulative material, such as silicone rubber impregnated glass fiber fabric. A second or middle layer 98 is comprised of an electrical heating element constituted as a Nichrome wire grid 99 embedded in silicone rubber. A third or distal layer 101 is constituted as another layer of silicone rubber impregnated glass fiber fabric. At the edge of the heat pad 71, the first and third, or proximal and distal layers 97, 101, are heat-sealed, bonded or otherwise suitably joined, as shown at edge 102 in FIG. 8 to protect and isolate the middle layer 98. Heat pad 71 can be relatively thin. The first, second and third layers together comprise a thickness of approximately 0.075 inches (0.190 cm). The heat pad power lead is attached to the grid 99 during manufacture of the pad.

The various first through fifth heat pads are physically sized and shaped to fit upon the externally exposed surfaces of the castings of the engine and gearboxes. The external power source can be any voltage but will typically be 115 volts or 220 volts. It is desirable that each heat pad be of a size to achieve a 50 degrees F. to 70 degrees F. rise in temperature over the ambient temperature. This is achieved for the most part by experimentation. The surface temperature of the heat pad must not exceed 400 degrees F. if it is to have an acceptable life. It should be of 10 watts or less power per square inch to keep from exceeding this surface temperature. Knowledge of the shape and area to be heated and the voltage and wattage of the heating element permits a determination of the design of the heating element to use at a particular location. Accordingly, the temperature control of each of the components in this system is accomplished by matching the wattage of the heat pads to the heat losses at the particular location. When this is properly done, no thermostat is needed. However, the heaters could alternatively be controlled by thermostats placed in series with the power leads and held in contact with the component surface. The thermostat encapsulated in silicone rubber impregnated fiber glass and bonded to the component surface would accomplish this.

As a specific example on a particular helicopter, an assembly according to the invention can have the following configuration. A pair of first heat pads for installation on the engine assembly are bonded to the accessory gear case of each engine on the flat surface below the data plate, have a power of 120 watts and are a rectangular 2 inches by 6 inches. A pair of second heat pads with a power of 120 watts and of a size of 1.75 inches by 7 inches are bonded to the front side of the main rotor gearbox below the lubricant level. A third 40 watt heat pad of a 2 inch by 3 inch size is bonded to each side of the oil tank/cooler assembly. A 40 watt, 2 inch by 2 inch fourth heat pad is bonded to the tail rotor gearbox. As shown in FIG. 4, fourth heat pad 46 is generally rectangular but can be contoured in the vicinity of the oil level check plug to optimize heat distribution. A fifth 90 watt, 3 inch by 3 inch heat pad is bonded to the right-hand side of the intermediate transmission with the power lead forwardly extended. Having such a preheat assembly configuration, when the helicopter is needed, even at very low temperatures, the unit is unplugged from the external power source, the engines are started and the aircraft is promptly ready for take-off.

In terms of a method, a series of heaters are installed on various components of the helicopter. A first heat pad is installed on the accessory gear case of the engine. A second heat pad is installed on the main rotary gearbox below the lubricant level. A third heat pad is installed with respect to the oil tank/cooler assembly. A fourth heat pad is installed upon the gearbox of the tail rotor. Finally, a fifth heat pad is installed with respect to the gearbox of the intermediate transmission. Harness means are employed to connect the heat pads to an external power source. The heat pads are activated during low temperature conditions in order to preheat the critical aircraft systems.

The embodiments of the invention in which an exclusive property or privilege is claimed are defined as follows:

1. A preheat apparatus for a helicopter of the type having a turboshaft engine with an engine accessory drive gear case, a main rotor gear case, a tail rotor gear case, an oil tank and coller assembly, and an intermediate gear case, said apparatus comprising:
   a first flat flexible electric heat pad, means installing the first head pad exteriorly on the engine accessory drive gear case at a lower portion thereof in position to supply heat to the accessory drive gear case and interior parts for maintenance of proper operating clearances;
   a second flat flexible electric heat pad, means installing the second heat pad exteriorly on the main rotor gear case at a location in position to supply sufficient heat to the main rotor gear case and interior parts for maintenance of proper operating clearances;
   a third flat flexible electric heat pad, means installing the third heat pad exteriorly on the tail rotor gear case in position to supply sufficient heat to the tail rotor gear case and interior parts for maintenance of proper operating clearances;
   a fourth flat flexible heat pad, means installing the fourth heat pad exteriorly on the oil tank and cooler assembly;
   a fifth flat flexible electric heat pad, means installing the fifth heat pad exteriorly on the intermediate gear case in position to supply sufficient heat to the intermediate gear case and interior parts for maintenance of proper operating clearances;
   electric harness means interconnecting the first through fifth heat pads and having a main power lead connectable to an external source of electric power.

2. The preheat apparatus of claim 1 including: a pair of second heat pads installed on the main rotor gear case, and a pair of fourth electric heat pads installed on the oil tank and cooler assembly.

3. A preheat apparatus of claim 1 wherein: said fifth heat pad is fixed to the intermediate transmission gear case at a location beneath the lubricant level.

4. The preheat apparatus of claim 3 wherein: said first through fifth heat pads are comprised as flat members having a first layer of insulative material, a second layer comprised of an electrical heating element, and a third layer of insulative material joined edgewise to the first layer whereby the heating element is disposed between the first and third layers.

5. The preheat apparatus of claim 4 wherein: each of the first through fifth heat pads has a power-lead with a releasable plug connectable to the electrical harness means.

6. The preheat apparatus of claim 5 wherein: each of the first through fifth heat pads has a watt density not exceeding 10 watts per square inch.

7. A turboshaft engine helicopter preheat assembly for preheat of certain critical helicopter components preparatory to takeoff, said helicopter preheat assembly comprising:
a plurality of critical helicopter components installed on a helicopter including an engine accessory gear case, a main rotor gear case, an oil tank and cooling assembly, an intermediate gear case, and a tail rotor gear case;
a first flat heat pad installed exteriorly on a first of said components;
a second flat heat pad installed exteriorly on a second of said components;
a third flat heat pad installed exteriorly on a third of said components;
at least two of said heat pads installed on gear cases in position to supply sufficient heat to the gear case and interior parts thereof for maintenance of proper operating clearances;
electrical harness means interconnecting the heat pads;
a main power lead connected to the electrical harness means and having an end extendible to an external source of electrical power for simultaneous energization of the heat pads.

8. The helicopter preheat apparatus of claim 7 including: a fourth heat pad installed on a fourth of said components; and a fifth heat pad installed on a fifth of said components.

9. The helicopter preheat apparatus of claim 8 wherein: said first through fifth heat pads have a power density not exceeding 10 watts per square inch.

10. A method of preheating a turboshaft engine helicopter at low temperature preparatory to takeoff comprising:
installing a first flexible, flat heat pad on the engine accessory gear case of the engine on a lower portion thereof in position to supply sufficient heat to the accessory gear case and interior parts for maintenance of proper operating clearances;
a second flexible, flat heat pad on the main rotor gear case in position to supply sufficient heat to the main rotor gear case and interior parts for maintenance of proper operating clearances;
a third flexible, flat heat pad on the oil tank/cooler assembly below the oil storage level;
a fourth flexible, flat heat pad on the tail rotor gear case in position to supply sufficient heat to the tail rotor gear case and interior parts for maintenance of proper operating clearances;
a fifth flexible, flat heat pad on the intermediate transmission gear case in position to supply sufficient heat to the intermediate transmission gear case and interior parts for maintenance of proper operating clearances;
connecting the first through fifth heat pads with electrical harness means; and
simultaneously energizing the first through fifth heat pads by connecting the harness means to an external source of electricity.

11. The method of preheating a helicopter of claim 10 including: installing a heat pad on the fuel control unit and installing a heat pad with respect to the drive reduction gear case.

12. A method of preheating a turboshaft engine helicopter of the type having as critical components an engine accessory gear case; a main rotor gear case; an oil tank and cooling assembly; an intermediate gear case; and a tail rotor gear case comprising:
installing a first flexible, flat heat pad on a first of said components;
installing a second flexible, flat heat pad on a second of said components;
installing a third flexible, flat heat pad on a third of said components, wherein at least two of said heat pads are positioned to supply sufficient heat to gear cases and interior parts thereof for maintenance of proper operating clearances;
connecting the first, second and third heat pads with wiring harness means and supplying electrical power to the wiring harness means.

13. The method of preheating a helicopter of claim 12 including: installing a fourth heat pad on a fourth of said components; and installing a fifth heat pad on a fifth of said components; and connecting the fourth and fifth heat pads to the wiring harness means.

14. The method of preheating a helicopter of claim 12 wherein said helicopter also has as critical components a fuel control unit and a drive reduction gear case, and including: installing a fourth heat pad on a fourth of said critical components.

15. The method of preheating a helicopter of claim 14 including the step of: installing a fifth heat pad on a fifth of said components and connecting said fifth heat pad to the wiring harness means.

16. A preheat apparatus for a helicopter of the type having a turboshaft engine with an engine accessory drive gear case, a main rotor gear case, a tail rotor gear case, an oil tank and cooler assembly, and said apparatus comprising:
a first flat flexible electric heat pad, means installing the first heat pad exteriorly on the engine accessory drive gear case at a lower portion thereof in position to supply heat to the accessory drive gear case and interior parts for maintenance of proper operating clearances;
a second flat flexible electric heat pad, means installing the second heat pad exteriorly on the main rotor gear case at a location in position to supply sufficient heat to the main rotor gear case and interior parts for maintenance of proper operating clearances;
a third flat flexible electric heat pad, means installing the third heat pad exteriorly on the tail rotor gear case in position to supply sufficient heat to the tail rotor gear case for maintenance of proper operating clearances;

a fourth flat flexible heat pad, means installing the fourth heat pad exteriorly on the oil tank and cooler assembly;

electric harness means interconnecting the first through fifth heat pads and having a main power lead connectable to an external source of electric power.

17. The helicopter preheat assembly of claim 16 wherein said helicopter includes a fuel control unit and including: a fifth flat flexible electric heat pad, means installing the fifth heat pad on the fuel control unit.

18. A method of preheating a turboshaft engine helicopter at low temperature preparatory to takeoff comprising:

installing a first flexible, flat heat pad on the engine accessory gear case of the engine on a lower portion thereof in position to supply sufficient heat to the accessory gear case and interior parts for maintenance of proper operating clearances;

a second flexible, flat heat pad on the main rotor gear case in position to supply sufficient heat to the main rotor gear case and interior parts for maintenance of proper operating clearances;

a third flexible, flat heat pad on the oil tank/cooler assembly below the oil storage level;

a fourth flexible, flat heat pad on the tail rotor gear case in position to supply sufficient heat to the tail rotor gear case and interior parts for maintenance of proper operating clearances;

connecting the first through fourth heat pads with electrical harness means; and simultaneously energizing the first through fourth heat pads by connecting the harness means to an external source of electricity.

* * * * *